Nov. 2, 1954          G. S. GROSCH          2,693,392
WHEEL TREAD VARYING MEANS
Filed Jan. 7, 1950          2 Sheets—Sheet 1
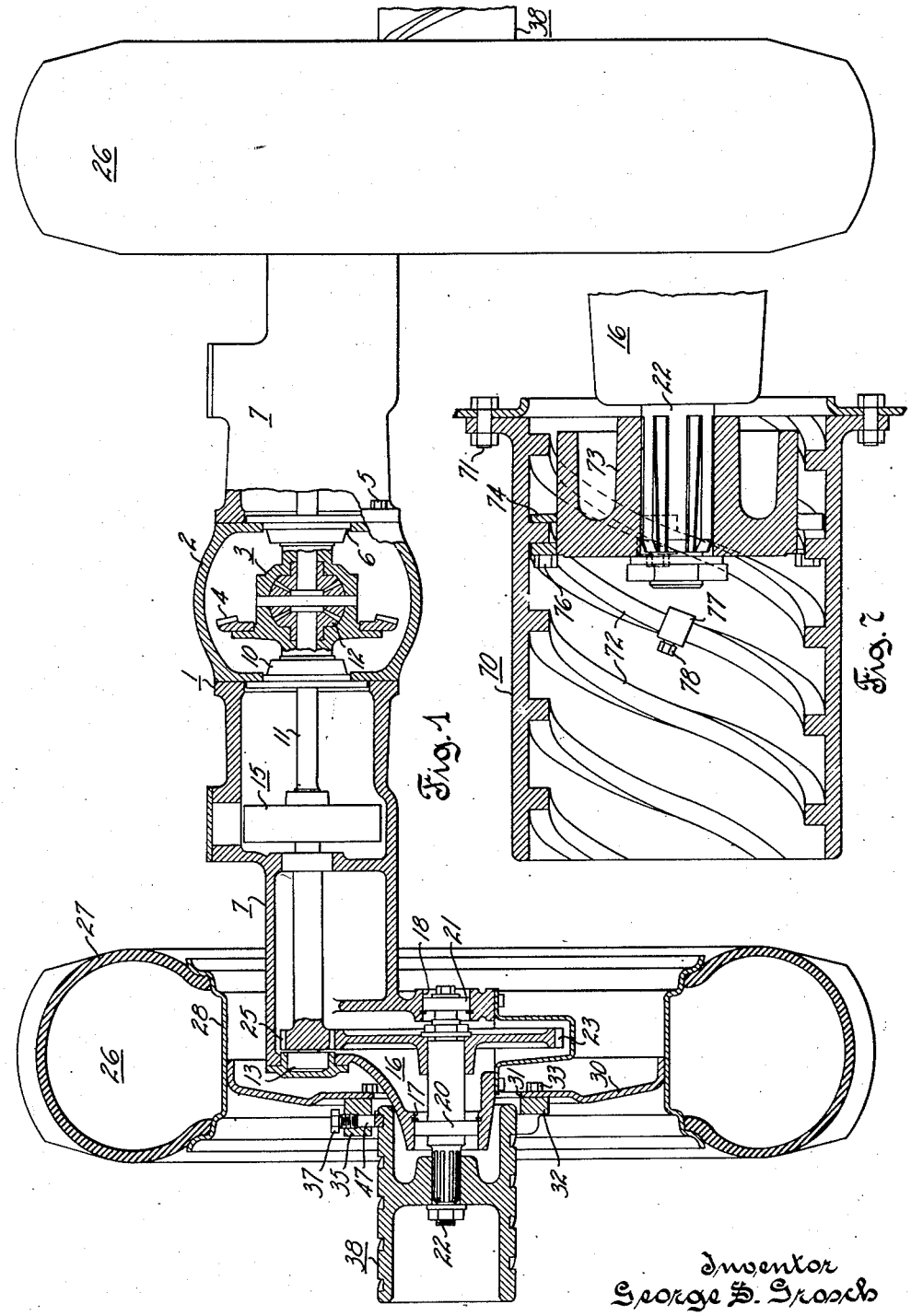
Inventor
George S. Grosch
by James T. Coffee
Attorney Nov. 2, 1954 — G. S. GROSCH — 2,693,392
WHEEL TREAD VARYING MEANS
Filed Jan. 7, 1950 — 2 Sheets-Sheet 2
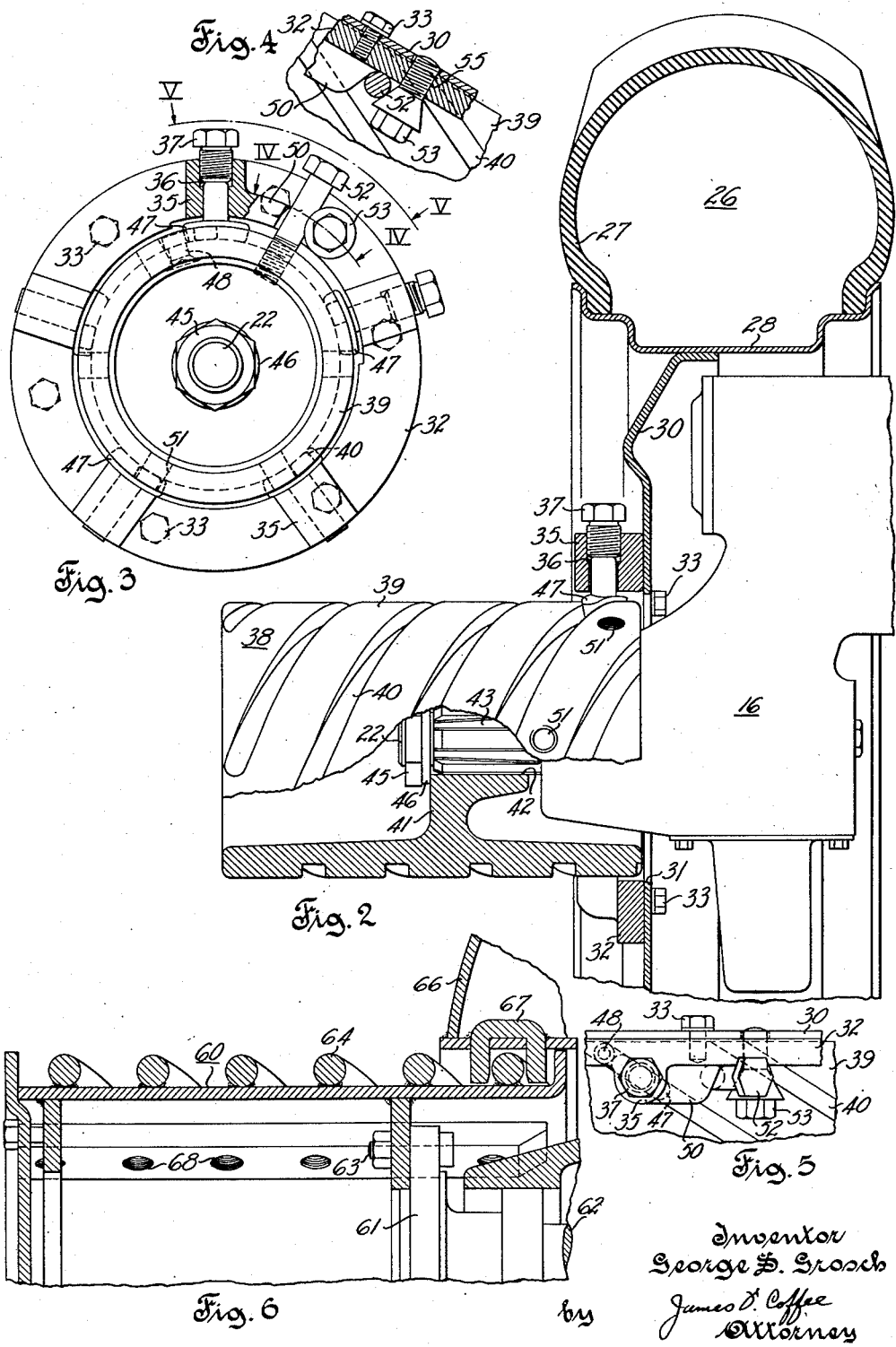

United States Patent Office 2,693,392
Patented Nov. 2, 1954

2,693,392

WHEEL TREAD VARYING MEANS

George S. Grosch, Groveland, Fla., assignor to Allis-Chalmers Manufacturing Company, Milwaukee, Wis., a corporation of Delaware Application January 7, 1950, Serial No. 137,427

5 Claims. (Cl. 301—1)

This invention relates to vehicles and is more particularly directed to self-propelled vehicles of the type in which the lateral spacing between driving wheels may be selectively varied through use of power derived from the vehicle engine.

In the course of farming operations which involve the use of a tractor as a mobile source of power it is frequently desirable to change the lateral spacing of the tractor wheels, either to conform with the different crop row widths or to correct the line of draft for a given implement in order to make the tractor more stable and efficient. In most tractors this adjustment of tread spacing is a manual operation requiring considerable time and effort on the part of the tractor operator and, as a result, is frequently neglected at the expense of tractor efficiency and crop yield. To avoid this difficulty there have been devised various means for laterally shifting the tractor driving wheels through use of power from the tractor engine. And the present invention is directed toward an improvement of the latter type of wheel adjusting means utilizing tractor engine power.

In the known practical type wheel constructions affording adjustment of tread width spacing through use of tractor engine power, such as those shown in U. S. Patent 2,417,139 and U. S. 2,432,385, the relative movement affording such adjustment has been between the rim and the main wheel portion. And in order to achieve a practical range of adjustment in this manner it is necessary that a relatively wide rim be used with the wheel, since the maximum width of adjustment conforms generally with the width of the wheel rim. It is true that a narrower rim may be used in either of the structures referred to above and still achieve considerable lateral adjustment by extending the adjusting means beyond the edges of the rim. However, this is undesirable in that standing crops are thereby exposed to the danger of damage by contact with the projecting parts as the tractor travels along the row. And where the amount of adjustment depends largely on the width of the rim used the smaller tractors, which are designed particularly for work with crops planted in closely spaced rows and require a narrow wheel, are necessarily quite limited in the amount of tread spacing adjustment they can offer with wheels of the adjustable rim type.

Moreover, where drop type axles are employed, as in U. S. Patent 2,417,139, there exists the problem of sufficient clearance for the adjusting parts carried by the rim and/or outer part of the central wheel portion. This is particularly critical of course when the wheel is adjusted to its innermost position with the rim closely adjacent to or in overlying relation to the final drive housing, and on smaller tractors the condition might be such that oversized wheels must be used in order to achieve power adjustment of the wheels without interference by the final drive housing. This is unsatisfactory in that it entails added expense in the making of a satisfactory wheel for what is generally intended to be a low cost tractor.

And, accordingly, it is a primary object of this invention to provide means including a separable wheel hub part constructed in a new and improved manner for coaction with the main wheel portion to provide axial adjustment of the latter relative to the former.

A further object of the present invention is to provide new and improved means affording adjustment of vehicle wheel tread width spacing through power adjustment comprising a wheel hub part which is separable from the main portion of the wheel and may be readily adapted for use with any conventional disk type wheel, whether mounted on a straight or drop type axle, without altering the outside diameter of the disk or width of the rim carried thereby.

Still another object of this invention is to provide means constructed and arranged in a novel manner for adjustment of vehicle tread width spacing through engine power comprising a hub part separable from the main portion of the wheel and readily adapted for detachable fixed connection with any conventional type axle in coaxial alignment therewith.

Another object of this invention is to provide new and improved tread width adjusting means for vehicle wheels comprising a hub part separable from the axle and main wheel portion and a connecting part detachably mounted on the main wheel portion and coactable with the hub to provide axial adjustment of the main wheel portion relative to the hub.

And, accordingly, the present invention may be considered as comprising the various combinations and constructions as hereinafter pointed out in the description and claims, reference being had to the accompanying drawings, in which:

Fig. 1 is a rear view of a tractor driving support with parts thereof in section and with the wheels shown in narrow tread position;

Fig. 2 is an enlarged view of the left wheel shown in Fig. 1 with parts omitted or broken away for the sake of clarity;

Fig. 3 is an end view of the hub shown in Fig. 2 together with the immediately adjacent portions of the wheel and axle structure, as seen when looking inward toward the drop axle structure;

Fig. 4 is a development of the section taken along line IV—IV in Fig. 3;

Fig. 5 is a partial plan view of the structure shown in Fig. 3, taken generally along line V—V;

Fig. 6 is a modification of the wheel assembly shown in Figs. 1–5, Fig. 6 being a partial sectional view of the modified hub and related parts similar to that shown in Fig. 2; and Fig. 7 is a further modification wherein a view similar to Fig. 1 is employed to show another variation of the present invention.

Referring to Fig 1 it is seen that the structure chosen to illustrate the present invention comprises generally a tractor 1 of which only the rear central body portion and supporting structure therefor is shown. Since the tractor body and power unit may be of any conventional type and form no part of this invention, it is believed that a complete showing of such parts is not essential to a full understanding of the invention.

The rear portion of the tractor body comprises a hollow casing 2 enclosing differential gearing 3 including a ring gear 4 which is driven by the engine through the transmission in a conventional manner not shown. Opposite side walls of casing 2 have aligned transverse openings 6 therethrough and an axle housing 7 is detachably secured to each side of this casing, as by cap screws 5, in enclosing relation to the openings 6. Bearing means 10 are mounted in each of the openings for rotatably supporting the inner end of a shaft 11 which extends into casing 2 for engagement with a pinion gear 12 of the differential for rotation therewith. The opposite or outer end of shaft 11 is journaled in a bearing means 13 carried by the free end of axle housing 7. A brake means, designated generally as 15, is carried by an intermediate portion of each shaft for controlling the rotation thereof in the usual way.

The outer end of axle housing 7 has a depending portion 16 thereof presenting aligned transverse openings 17 and 18 with bearings 20 and 21, respectively, therein for rotatably supporting an axle shaft 22. A bull gear 23 is fixed to axle 22 for rotation therewith and is disposed in constant meshing engagement with a pinion 25 nonrotatably fixed to shaft 11. Thus it will be seen that power is conveyed from the differential mechanism 3 to axle 22.

The outer end of each of the axles 22 mounts a wheel 26 in supporting relation to the tractor for adjustment laterally with respect thereto. The wheel structure and associated parts affording such adjustment is identical for the right and left hand wheels shown in Fig. 1, and, therefore, a description of the left hand wheel only is believed adequate. The outer part of the wheel assembly is more or less conventional and includes a tire 27 mounted on a rim 28 supportedly fixed in any suitable manner, as by welding, to a disk shaped central part 30 having a relatively large central opening 31. Adjacent opening 31 is a series of circumferentially spaced bolt receiving openings (not shown) affording means for securing a ring element 32 thereto which is fixed in place on the wheel disk by cap screws 33 or the like.

In the preferred embodiment shown in Figs. 1–5 ring element 32 is formed with five circumferentially spaced outwardly projecting portions 35 each having an opening 36 therethrough normal to the axis of the ring. The outer portion of two of these openings is internally threaded to receive an adjusting screw 37 therein (Fig. 3) for purposes described hereinafter.

For connecting wheel 26 to axle 22 in laterally adjustable fixed relation thereto there is provided a hub 38 comprising a cylindrical part 39 having parallel spiral grooves 40 formed in its outer surface and having an internal web portion 41 provided with a splined opening 42 therethrough for cooperatively engaging a splined end section 43 of the axle to thereby prevent relative rotation between the hub and axle. To prevent axial separation of the hub and axle a nut 45 and washer 46 are placed on the threaded end of the axle in abutting relation to the hub web 41. Thus it is seen that hub 38 rotates with axle 22 when brake 15 is released and power is delivered to the differential by the engine (not shown).

Referring particularly to Figs 2 and 3 it will be noted that the radial openings 36 in projecting portions 35 of ring 32 each contain a mushroom shaped lug element 47 with the stem portion thereof held in place by the ring and the flanged portion thereof extending inwardly therefrom. These lug elements are positioned along ring 32 to conform with the spacing of the individual grooves 40 on hub 38 and are made slightly narrower than the grooves so that they can be readily seated in the grooves as shown in the drawings. And in this connection, it should be noted that the lug elements associated with the two internally threaded openings 36 have relatively short stems (Fig. 3) with the free ends thereof abutting set screws 37 which are inserted in threaded openings 36 and afford means for adjusting the amount of tolerance between the lugs and grooves to provide for relative sliding movement therebetween.

At this point it should be noted that with lug elements 47 positioned in grooves 40, as described above, the rotation of hub 38 will transmit a lateral thrust through grooves 40 and lugs 47 to wheel disk 30 and cause a resulting lateral shifting of the wheel. And in order to effectively control this shifting movement of the wheel there is provided suitable stop means now to be described.

As shown in the drawings spiral grooves 40 have been formed by cutting from the inner end of the hub to points adjacent the outer end thereof which leaves the inner ends of these grooves open thus making it possible for lug elements 47 to move out of engagement with the hub. And in order to prevent such separation of the lug and grooves there is provided a stud or set screw 48 (Fig. 3) which is positioned in the hub to extend upward into one of the grooves adjacent the inner end thereof to prevent movement of the related lug inwardly therebeyond. It may be desirable to place such a stop means in one or more of the other grooves where the weight of the wheel is such that the lateral thrust of the wheel is too great to be stopped by only one stud. However, in the average size tractor wheel (9" x 24" tire) a single stop is believed sufficient.

And for selectively stopping the lateral movement of the wheel relative to the hub one of the projecting parts 35 of ring 32 is provided with a shoulder portion 50 (Figs 3, 4 and 5) and the hub is provided with a series of stop bolt holes 51 located therein between the two adjacent grooves receiving the lug elements 47 which are disposed in the two internally threaded holes 36. A stop bolt 52 is positioned in a selected one of the holes 51, and when engaged by the projection 50 on ring 32, this relationship is maintained by inserting a lock screw 53 in an opening 55 provided therefor in ring 32 as seen in Fig. 4. Each of the stop bolt holes is preferably located to afford a definite increment adjustment of the wheel. In the illustrated embodiment the bolt holes have been placed 60° apart around the circumference of hub 38.

As shown in the drawings (Figs. 1 to 5) wheel 26 is in its innermost position and relative turning movement of hub 38 and the wheel has been prevented by inserting stop bolt 52 in the innermost hole adjacent shoulder 50 and lockscrew 53 is fastened into its opening 55 in ring 32 as shown in Figs. 3 and 4. Thus turning movement of the wheel in either direction relative to the hub is prevented and the wheel will turn with the axle. To shift the wheel to another position along hub 38 lock screw 53 is removed and stop bolt 52 is shifted to another selected one of the holes 51 in the hub. Brake 15 on the right side of the tractor is then set and power applied to the differential from the engine by shifting to a forward speed. This will cause the left axle and the hub positioned thereon to rotate and the thrust of grooves 40 on lug elements 47 will effect an outward shift of wheel 26. When shoulder 50 engages the newly positioned bolt 52 wheel 26 will cease to rotate relative to the hub and it may then be locked in place by inserting lock screw 53 in opennig 55 of the ring as shown in Fig. 4.

To return wheel 26 to a narrower tread position the same procedure is applied except that reverse motion is applied to the axle in order to effect an inward thrust on lug elements 47.

The right hand wheel may be adjusted in a similar manner except that for moving the wheel outward the right axle 22 must be rotated in reverse speed and for moving the wheel inward a forward speed must be applied since similarly cut hubs are used for both wheels. Of course, if it is desired to avoid this difference in the manner of adjusting right and left wheels two separate hubs may be provided, one with right hand grooves and one with left hand grooves, but this would entail some added expense and inconvenience.

Although the hub may be constructed with grooves cut the entire length and studs, similar to stop pins 48, provided at both ends of one or more grooves to prevent axial separation of the disk and hub, the preferred embodiment (Fig. 2) shows the grooves terminated in advance of the outer end so that the uncut material provides a stop for lug elements. Furthermore, it should be understood that the length of the hub as well as the length and pitch of spiral grooves 40 may be varied as desired.

It will also be noted that wheel rim 28 is offset laterally with respect to the vertical plane of the hub bolt receiving openings in disk 30 and, consequently, a different range of tread widths may be achieved by reversing the disk relaive to the hub.

A variation of the above described structure is shown in Fig. 6 wherein a hollow cylindrical hub 60 is detachably fixed to a radially flanged portion 61 of the axle shaft 62 by bolts 63, or the like, and the outer surface of the hub has spirally wound guide means 64 fixed thereto as by welding. The disk portion 66 of the wheel has fixed thereto a yoke member 67 adapted to fit over guide means 64 and afford relative movement between the hub and wheel disk. Threaded openings 68 are positioned along hub 60 between guide means 64 and afford means for receiving stop bolts (not shown) therein which coact with a flanged portion (not shown) of disk 66, or other suitable means fixed to the disk, to prevent relative turning movement between the disk and hub.

And looking now at Fig. 7 it will be seen that a further modified form of the present invention comprises a hollow cylindrical hub 70 detachably connected to the disk portion of the wheel by bolts 71, or the like, and having spiral guide means 72 formed on the inner surface of the hub. A hub attaching part 73 is splined to the axle, in a manner similar to that described above with respect to the hub in Figs. 1 and 2, and includes projecting portions 74 thereon which are adapted to engage spiral tracks 72 on the hub. Any suitable means such as set screw 76 may be provided for securing part 73 against rotation with respect to the hub. Consequently, when set screws 76 are threaded out of engagement with the tracks and power is applied to axle 22 relative rotation of the hub and axle is effected to exert a lateral thrust on the tracks and thereby shift the wheel laterally. To stop the lateral movement of the wheel at any selected point there is provided suitable means such as lug 77 which is slidably fixed to the track and may be secured in place as by set screw 78 to prevent movement of projecting portions 74 therebeyond. A similar lug (not shown) may then be placed on the opposite side of projecting portion 74 to lock the hub and axle against relative turning movement.

It is to be noted that the main portion of the wheel used to illustrate the present invention, as shown in Figs. 1, 2 and 7, is conventional in structure and, consequently, any ordinary tractor type wheel may be readily converted to one adapted for use with a hub similar to one of the two shown in the above mentioned drawings. The only modification required is to reconstruct the disk portion of the wheel to include a relatively large central opening with circumferentially spaced bolt receiving openings adjacent thereto for securing a lug supporting ring in place. Thus it will be seen that power adjusted tread spacing may be provided for any tractor having differentially driven axle shafts without altering the axle or substituting new wheels of special design.

And although shown and described with respect to particular structures, it should be understood that it is not intended to limit the invention to the exact constructions herein illustrated as various modifications within the scope of the appended claims may occur to persons skilled in the art.

It is claimed and desired to secure by Letters Patent:

1. In a vehicle wheel, a hub part, a rim, a rim supporting part, and means for operatively mounting said rim supporting part on said hub part in rotatable and axially shiftable relation thereto, said means comprising a plurality of individual spiral guide means on said hub part, a plurality of follower elements connected with said rim supporting part and operatively associated, respectively, with said guide means and movable therealong upon relative rotation of said hub and rim supporting parts to thereby cause adjustment of said rim supporting part axially of said hub part, said hub part presenting a series of axially spaced openings formed therein, a stop element positionable in a selected one of said openings, and a part projecting from said rim supporting part and positioned for coaction with said stop element to limit the relative movement between said hub part and said rim supporting part to thereby establish a one way driving connection therebetween.

2. In a vehicle wheel, a hub part, a rim, a rim supporting part, and means for operatively mounting said rim supporting part on said hub part in rotatable and axially shiftable relation thereto, said means comprising a plurality of individual parallel spiral grooves formed in said hub part, a plurality of lug elements connected with said rim supporting part and operatively associated, respectively, with said grooves and movable therein upon relative rotation of said hub and rim supporting parts to thereby cause adjustment of said rim supporting part axially of said hub part, spirally spaced openings adjacent one of said grooves, a stop element positionable in a selected one of said openings, and a part projecting from said rim supporting part and positioned for coaction with said stop element to limit the relative movement between said hub part and said rim supporting part to thereby establish a driving connection therebetween.

3. In a wheel supported vehicle having a body structure and a supporting wheel therefor mounted on a power driven axle carried by said body structure, the combination of a cylindrical hub element nonrotatably mounted in axially fixed position on said axle and comprising the inner part of said wheel, an annular element forming the outer part of said wheel, a central part of said wheel having its outer portion fixed in supporting relation to said annular element, and means for operatively connecting said central part on said hub element in rotatable and axially shiftable relation thereto, said means comprising a plurality of individual parallel spiral grooves formed along the outer surface of said hub element, a plurality of lug elements detachably connected to said central part in adjustable fixed relation thereto and operatively associated, respectively, with said grooves and movable therein upon relative rotation of said hub element and central part, and releasable locking means including a pair of coacting elements positionable, respectively, on said central part and hub element for establishing a two way driving connection between said hub element and central part in any selected position of axial adjustment of the latter with respect to the former.

4. Means for interconnecting a wheel disk and a rotatable axle in laterally adjustable fixed relation comprising, a generally cylindrical hub including means for detachably fixing said hub to an end portion of the axle in coaxial relation therewith, said hub also having a plurality of spiral grooves formed along the outer surface thereof, a ring element adapted for detachable connection with the wheel disk, a plurality of lugs adjustably carried by said ring element and adapted for coaction with said grooves to afford relative movement between said lugs and said grooves to thereby move said ring element axially along said hub, and releasable locking means for establishing a fixed connection between said ring element and said hub in any selected position of axial adjustment of the former with respect to the latter.

5. In a wheel supported vehicle having a body structure and a supporting wheel therefor mounted on an axle carried by said body structure, the combination of a rotatable hub part mounted in axially fixed position on said axle, a rim, a rim supporting part, and means for operatively mounting said rim supporting part on said hub part in rotatable and axially shiftable relation thereto, said means comprising a plurality of individual parallel spaced spiral grooves formed along the outer surface of said hub part, a plurality of lug elements connected with said rim supporting part and operatively associated, respectively, with said grooves and movable therein upon relative rotation of said hub and rim supporting parts to thereby cause adjustment of said rim supporting part axially of said hub part, and releasable locking means including a first element positionable on said rim supporting part for movement therewith with respect to said hub part upon relative rotation of said hub and rim supporting parts and a second element positionable on said hub part for movement therewith and into the path of said first element upon relative rotation of said hub and rim supporting parts for establishing a driving connection between said hub and rim supporting parts in any selected position of axial adjustment of the latter with respect to the former.

References Cited in the file of this patent

UNITED STATES PATENTS

| Number | Name | Date |
| --- | --- | --- |
| 2,235,457 | Lorimor | Mar. 18, 1941 |
| 2,324,681 | Dekker | July 20, 1943 |
| 2,327,122 | Mehlman | Aug. 17, 1943 |
| 2,417,139 | Strehlow | Mar. 11, 1947 |
| 2,432,385 | Court | Dec. 9, 1947 |
| 2,458,249 | Bunting | Jan. 4, 1949 |
| 2,472,742 | Brown | June 7, 1949 |

FOREIGN PATENTS

| Number | Country | Date |
| --- | --- | --- |
| 504,469 | Great Britain | Apr. 26, 1939 |